(12) United States Patent
Sunvold et al.

(10) Patent No.: US 8,762,865 B2
(45) Date of Patent: Jun. 24, 2014

(54) INTERACTIVE SURVEY FEEDBACK TOOL

(75) Inventors: Gregory Dean Sunvold, Lewisburg, OH (US); Dennis Richard Ditmer, Springboro, OH (US); Paula Jean Pierce, Vandalia, OH (US)

(73) Assignee: The IAMs Company, Cincinnati, OH (US)

( * ) Notice: Subject to any disclaimer, the term of this patent is extended or adjusted under 35 U.S.C. 154(b) by 1075 days.

(21) Appl. No.: 12/316,653

(22) Filed: Dec. 15, 2008

(65) Prior Publication Data

US 2009/0164341 A1 Jun. 25, 2009

Related U.S. Application Data

(60) Provisional application No. 61/008,284, filed on Dec. 19, 2007.

(51) Int. Cl.
*G06F 3/00* (2006.01)

(52) U.S. Cl.
USPC .......................................... 715/764; 705/27.2

(58) Field of Classification Search
USPC ............... 705/1, 26.1, 35, 1.1, 7.35, 15, 27.1, 705/27.2, 26.4; 426/2, 582, 623, 656; 715/736, 764–768, 843
See application file for complete search history.

(56) References Cited

U.S. PATENT DOCUMENTS

| | | | | |
|---|---|---|---|---|
| 4,015,026 A | * | 3/1977 | Burkwall et al. | 426/582 |
| 5,141,755 A | * | 8/1992 | Weisman | 426/42 |
| 5,503,868 A | * | 4/1996 | Fallin et al. | 426/656 |
| 6,189,029 B1 | | 2/2001 | Fuerst | |
| 6,236,974 B1 | * | 5/2001 | Kolawa et al. | 705/7.32 |
| 6,311,190 B1 | | 10/2001 | Bayer et al. | |
| 6,358,546 B1 | | 3/2002 | Bebiak et al. | |
| 6,403,142 B1 | * | 6/2002 | McDaniel et al. | 426/623 |
| 6,456,981 B1 | | 9/2002 | Dejaeger et al. | |
| 6,488,202 B1 | * | 12/2002 | Seitz et al. | 235/78 R |
| 6,493,641 B1 | * | 12/2002 | Singh et al. | 702/32 |

(Continued)

FOREIGN PATENT DOCUMENTS

| | | |
|---|---|---|
| JP | 04/205368 A | 7/1992 |
| WO | WO 01/48660 A1 | 7/2001 |

OTHER PUBLICATIONS

"Easy-to-use three step process", http://www.makesurvey.net/,download May 24, 2007.

(Continued)

*Primary Examiner* — Andrew Joseph Rudy
(74) *Attorney, Agent, or Firm* — Alexandra S. Anoff

(57) ABSTRACT

A method of optimizing one or more attributes of a product according to a product context. A product context and one or more attributes of the product are presented to a user via a software graphical user interface (GUI). A visual rendering of the product including at least one attribute of the product may be presented via the GUI. The user either may select or modify the at least one attribute and submit a user input that corresponds to the attribute and/or the modified attribute of the product in reference to the product context. The user input is received and the product is displayed via the GUI based on the user input. If the attribute of the product was modified, then the attribute of the product is modified and displayed substantially simultaneously. A correlation between the user input and the attribute of the product in reference to the product context is determined when a termination command is received.

15 Claims, 12 Drawing Sheets

(56) References Cited

U.S. PATENT DOCUMENTS

| | | | |
|---|---|---|---|
| 6,576,280 B2 | 6/2003 | Bebiak et al. | |
| 6,618,746 B2 | 9/2003 | Desai et al. | |
| 6,669,975 B1 | 12/2003 | Abene et al. | |
| 6,778,193 B2* | 8/2004 | Biebesheimer et al. | 715/805 |
| 6,783,792 B2* | 8/2004 | McDaniel et al. | 426/623 |
| 6,826,540 B1* | 11/2004 | Plantec et al. | 705/7.32 |
| 6,993,495 B2 | 1/2006 | Smith et al. | |
| 7,007,245 B2* | 2/2006 | D'Souza et al. | 715/853 |
| 7,020,663 B2* | 3/2006 | Hay et al. | 434/317 |
| 7,026,929 B1* | 4/2006 | Wallace | 340/539.13 |
| 7,089,222 B1* | 8/2006 | Lannert et al. | 706/47 |
| 7,253,817 B1* | 8/2007 | Plantec et al. | 345/473 |
| 7,315,821 B2* | 1/2008 | Monchi et al. | 704/273 |
| 7,337,126 B2* | 2/2008 | Dietz et al. | 705/7.32 |
| 7,447,647 B1* | 11/2008 | Shedlack | 705/26.8 |
| 7,603,287 B2* | 10/2009 | Kargman | 705/15 |
| 7,761,751 B1* | 7/2010 | West | 714/703 |
| 7,778,898 B2* | 8/2010 | Rider et al. | 705/35 |
| 7,818,275 B2* | 10/2010 | Bertrand et al. | 706/45 |
| 7,881,960 B2* | 2/2011 | Ramamurti | 705/7.35 |
| 7,889,209 B2* | 2/2011 | Berger et al. | 345/585 |
| 7,941,786 B2* | 5/2011 | Scott et al. | 717/121 |
| 7,971,155 B1* | 6/2011 | Yoon | 715/843 |
| 8,001,013 B2* | 8/2011 | Serbanescu | 705/26.4 |
| 8,200,527 B1* | 6/2012 | Thompson et al. | 705/7.39 |
| 8,214,743 B2* | 7/2012 | Bandera et al. | 715/736 |
| 8,438,074 B2* | 5/2013 | Serbanescu | 705/26.4 |
| 8,456,484 B2* | 6/2013 | Berger et al. | 345/582 |
| 2001/0032115 A1 | 10/2001 | Goldstein | |
| 2002/0069207 A1 | 6/2002 | Alexander et al. | |
| 2002/0081356 A1 | 6/2002 | Bebiak et al. | |
| 2003/0004655 A1 | 1/2003 | Singh et al. | |
| 2003/0004733 A1 | 1/2003 | Norsworthy et al. | |
| 2003/0009370 A1 | 1/2003 | Singh et al. | |
| 2003/0139964 A1 | 7/2003 | Kortekaas et al. | |
| 2005/0065854 A1 | 3/2005 | Backman | |
| 2005/0193333 A1 | 9/2005 | Ebert | |
| 2006/0053058 A1 | 3/2006 | Hotchkiss et al. | |
| 2006/0200320 A1 | 9/2006 | Al-Murrani et al. | |
| 2007/0158909 A1* | 7/2007 | Cox | 273/292 |
| 2008/0249895 A1* | 10/2008 | Mariotti | 705/27 |

OTHER PUBLICATIONS

"FUSESurge", Interactive Product Testing Software, http://www.fuse.com.au/news/, download May 25, 2007.
"Professional Survey Software", KeySurvey, http://www.keysurvey.com/, download May 24, 2007.
"Tools/Services", Online Survey Design Guide, http://lap.umd.edu/survey_design/tools.html, download May 25, 2007.
Naps et al., "Using the WWW as the delivery mechanism for interactive, visualization-based instructional modules", ITiCSE' 1997 pp. 13-26.
Ganapathy et al., "Visualization Strategies and Tools for Enhancing Customer Relationship Management", Communication of ACM, Nov. 2001 pp. 92-99.
Database Compendex (OnLine) Engineering Information, Inc., New York, 2006, Franke et al: "Value creation by toolkits for user innovation and design: The case of the watch market" XP002520778.
Database Inspec (OnLine) the institution of electrical engineers, stevenage, gb Sep. 2002, Dahan E et al: "The virtual customer" XP002520779.
Sawhney, Verona, Prandelli: "Collaborating to create: the Internet as a platform for customer engagement in a product innovation" Journal of Interactive Marketing, (OnLine) vol. 19, No. 4, 2005, p. 4-16, XP002520777.
International Search Report.

* cited by examiner

Brand Name 1

Brand Name 1 Provides more for cat's lives

You want your cat to live life to the fullest. Brand Name 1 provides more for your cat's life. That's because it has more variety, taste and nutrition for your cat.

| Brand | Size | Price |
|---|---|---|
| Brand Name 1 Product Name 1 | 1.5 Pound | $3.45 |
| | 4 Pound | $7.94 |
| | 8 Pound | $13.94 |
| | 20 Pound | $26.42 |

| Other Leading Brands | Size | Price |
|---|---|---|
| Brand Name 2 Product Name 2 | 1.13 Pound | $1.58 |
| | 3.5 Pound | $4.11 |
| | 7 Pound | $7.10 |
| | 18 Pound | $9.69 |
| Brand Name 3 Product Name 3 | 1.01 Pound | $1.44 |
| | 3.15 Pound | $3.82 |
| | 6.3 Pound | $6.52 |
| | 18 Pound | $10.51 |
| Brand Name 4 Product Name 4 | 1.125 Pound | $2.11 |
| | 3.5 Pound | $5.24 |
| | 7 Pound | $9.32 |
| | 16 Pound | $16.32 |
| Brand Name 5 Product Name 5 | 4 Pound | $8.46 |
| | 10 Pound | $18.81 |
| | 20 Pound | $28.47 |
| Brand Name 6 Product Name 6 | 1.13 Pound | $1.58 |
| | 3.5 Pound | $4.11 |
| | 7 Pound | $7.10 |
| | 18 Pound | $9.69 |
| Brand Name 7 Product Name 7 | 4.4 Pound | $4.57 |
| | 8 Pound | $8.09 |

INTERACTIVE SURVEY FEEDBACK TOOL

CROSS REFERENCE TO RELATED APPLICATION

This application claims the benefit of U.S. Provisional Application No. 61/008,284, filed Dec. 19, 2007.

BACKGROUND

There is a need for business entities to use preference testing tools in order to improve future products and understand how a user perceives and associates a new product within a certain context. A user may be a consumer, pet owner, breeder, veterinarian, guardian, and/or any other person that may be associated with evaluating a new product. A product context refers to the environment, configuration, framework, and/or perspective that the user may associate with the product. It is also desirable to understand how well the user's perception matches actual attributes of a new product. Implementing a user preferences testing plan using actual models or prototypes of a new product is expensive, time consuming, and not very flexible. The user may not be able to communicate their perception in a meaningful manner and may have limited or no ability to modify the prototype to adequately fit their perception of the product based on a predetermined context. Traditional methods of optimizing attributes of a product include surveying a plurality of predetermined potential customers, evaluating the results of the survey, and implementing the optimization steps in a new product. However, this is a slow, time consuming process that lacks real time feedback and provides no opportunities for the user to modify the product to suit their perception of the product within a predetermined concept. Thus, there is a need for a method, apparatus, and system to optimize one or more attributes of a product according to a product context and determining a correlation of a user's perception of the product and the product context.

SUMMARY

In one embodiment, an attribute of a product is optimized according to a product context. A product context and an attribute of the product is presented to a user via a software graphical user interface (GUI). The user selects or modifies the attribute and submits a user input that corresponds to the attribute or the modified attribute of the product. The user input is received and the product is displayed via the GUI based on the user input. As the user modifies the attributes of the product, the modifications are displayed substantially simultaneously. A correlation between the user input and the attribute of the product in reference to the product context is determined when a termination command is received.

In another embodiment, an attribute of a product is optimized according to a product context. A product context is presented to a user via a software graphical user interface (GUI). A visual rendering of the product comprising at least one attribute of the product is presented via the GUI. A user input corresponding to an attribute of the product in reference to the product context is received. A correlation between the user input and an attribute of the product in reference to the product context is determined when a termination command is received.

FIGURES

The novel features of the various embodiments are set forth with particularity in the appended claims. The various embodiments, however, both as to organization and methods of operation, together with advantages thereof, may best be understood by reference to the following description, taken in conjunction with the accompanying drawings as follows.

FIGS. 4-12 illustrate various representative screen shots that may be used to implement one embodiment of a graphical user interface (GUI).

DESCRIPTION

Before explaining the various embodiments in detail, it should be noted that the embodiments are not limited in their application or use to the details of construction and arrangement of parts illustrated in the context of the accompanying drawings and description. The illustrative embodiments may be implemented or incorporated in other embodiments, variations and modifications, and may be practiced or carried out in various ways. For example, the embodiments configurations disclosed below are illustrative only and not meant to limit the scope or application thereof. Furthermore, unless otherwise indicated, the terms and expressions employed herein have been chosen for the purpose of describing the illustrative embodiments for the convenience of the reader and are not limited in this context.

Figure 1:
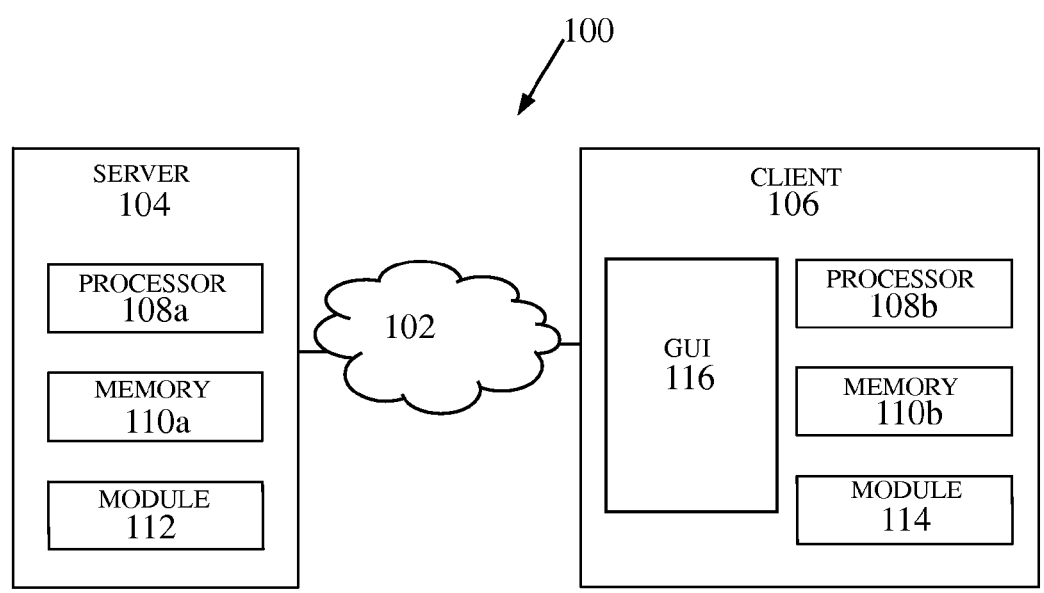
FIG. 1 illustrates one embodiment of a survey system.

FIG. 1 illustrates one embodiment of a survey system 100. The survey system 100 includes a network 102 in communication with one or more nodes. Examples of a node may comprise, for example, a computer, server, workstation, laptop, ultra-laptop, handheld computer, telephone, cellular telephone, pager, walkie-talkie, router, switch, bridge, hub, gateway, wireless access point (WAP), personal digital assistant (PDA), television, motion picture experts group audio player 3 device (MP3 player), global positioning system (GPS) device, electronic wallet, optical character recognition (OCR) scanner, medical device, camera, and so forth. In the illustrated embodiment, the network 102 is in communication with a server 104 node and a client 106 node. Although the server 104 and the client 106 are shown as single elements, the system 100 may comprise multiple servers 104 and clients 106 interconnected by one or more networks 102. Accordingly, the embodiments are not limited to the illustrated embodiments.

In various embodiments, the system 100 may comprise multiple modules connected by one or more communications media. Communications media generally may comprise any medium capable of carrying information signals. For example, communications media may comprise wired communications media, wireless communications media, or a combination of both, as desired for a given implementation. Examples of wired communications media may include a wire, cable, printed circuit board (PCB), backplane, semiconductor material, twisted-pair wire, co-axial cable, fiber optics, and so forth. An example of a wireless communications media may include portions of a wireless spectrum, such as the radio-frequency (RF) spectrum. The embodiments are not limited in this context.

The client 106 comprises a graphical user interface 116 (GUI) to interface with a human user. Collectively, the server 104, the client 106, and the GUI 116 may be referred to as a virtual product design tool. The network 102 may be any type of computer network, public or private, LAN and/or WAN, wire-based and/or wireless, and may use one or a combination of network protocols such as Ethernet or token ring. In one embodiment, the network 102 may comprise, for example, a packet network such as the Internet, a corporate or enterprise network, a voice network such as the Public Switched Telephone Network (PSTN), and so forth. The embodiments are not limited in this context.

In one embodiment, the server 104 and the client 106 may comprise a computer, a monitor, a microphone, and/or a video camera in addition to a mouse, keyboard and standard I/O ports (not shown). The server 104 and the client 106 each may comprise a processor 108a, 108b, respectively. The processor 108a, 108b may be implemented as a general purpose processor. For example, the processor 108a, 108b may comprise a general purpose processor made by Intel® Corporation, Santa Clara, Calif. The processor 108a, 108b also may comprise a dedicated processor, such as a controller, microcontroller, embedded processor, a digital signal processor (DSP), a network processor, an input/output (I/O) processor, a media processor, and so forth. The computer of the client 106 may be a cellular device for Internet access. As will be appreciated, the server 104 and the client 106 are not limited by any type of processor, particular hard disk drive, memory, sound card, or video card. It will appreciated that the processors 108a and 108b may be similar or may be different processors based on upon the desired execution power of the respective server 104 and the client 106. The embodiments are not limited in this context.

In one embodiment, the server 104 and the client 106 may comprise a memory 110a, 110b, respectively. The memory 110a, 110b may comprise any machine-readable or computer-readable media capable of storing data, including both volatile and non-volatile memory. For example, the memory 110a, 110b may comprise read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The memory 110a, 100b also may comprise storage devices such as magnetic or optical disk drives for storage and data base implementation.

The server 104 and the client 106 may include an operating system and application software, such as Microsoft® Windows, Microsoft® Internet Explorer®, voice recognition software, voice synthesis software, and video input. The server 104 may comprise a server application module 112 and the client may comprise a client application module 114. It will be appreciated by those of ordinary skill in the art that other operating system software, such as UNIX, LINUX, OS/2, BE, System 7, Solaris, Mac OS may be employed by the system 100 components. Likewise, the system 100 communication components are not limited by particular Internet communication software and, thus, common alternatives, or any of a number of small screen cellular or smart phone browsers, also may be used.

In one embodiment, the server 104 and the client 106 may comprise a framework of interfaced software modules, which may retrieve, process, create, format, and transmit certain data. In one embodiment, the server 104 executes modules to direct and control certain processes to be carried out by other modules and/or the client 106. These modules may interact with other software modules, such as services provided by the operating system or such as Internet connection, communication and transmission functions provided by an Internet browser module. Thus, in one embodiment, the modules are generally comprised of software instructions executable by the processor 108a, 108b.

In various implementations, the system 100 may be illustrated and described as comprising several separate functional elements, such as modules. Although certain modules may be described by way of example, it can be appreciated that a greater or lesser number of modules may be used and still fall within the scope of the embodiments. Further, although various embodiments may be described in terms of modules to facilitate description, such modules may be implemented by one or more hardware components (e.g., processors, application specific integrated circuit [ASIC], Programmable Logic Device [PLD] or digital signal processor [DSP] circuits, registers), software components (e.g., programs, subroutines, logic) and/or combination thereof.

The modules may comprise, or be implemented as, one or more software or hardware elements, or any combination thereof, as desired for a given set of design or performance constraints. Thus, as used herein, the term "module" refers not only to logic coded as a collection of software instructions, but also refers to logic embodied in hardware or firmware. In the software context, a module may have entry and exit points and may be coded in a high level language such as C, C++, Java, or Pascal, or may be coded in machine or assembler language. Software modules may be compiled and linked into an executable program or installed in a Dynamic Link Library (DLL). Software modules may also be coded in an interpretive language, such as BASIC. Software modules may be callable from other modules, may be nested within other modules, and/or may be invoked in response to a detected event or interrupt. Instructions of software modules may be coded into firmware, such as an EPROM. For example, the modules may comprise electronic elements fabricated on a substrate. In the hardware context, modules may be comprised of connected logic units, such as gates and flip-flops, and/or may be comprised of programmable units, such as programmable gate arrays. In various implementations, the electronic elements may be fabricated using silicon-based IC processes such as complementary metal oxide semiconductor (CMOS), bipolar, and bipolar CMOS (BiCMOS) processes, for example. The embodiments are not limited in this context.

Figure 2:
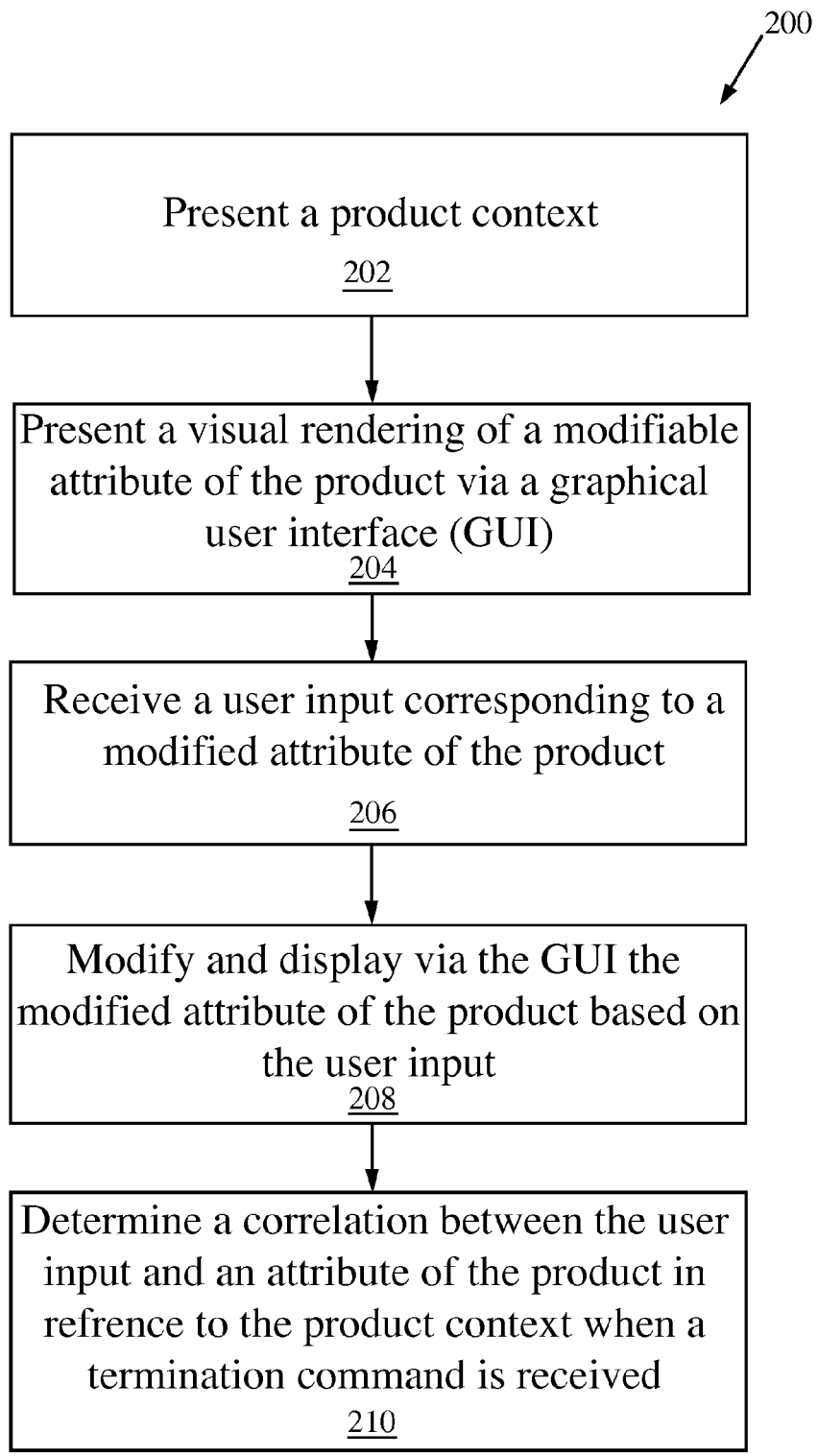
FIG. 2 illustrates a diagram that may be representative of the operations executed by one embodiment of the system shown in FIG. 1 to optimize an attribute of a product according to a product context.

FIG. 2 illustrates a diagram 200 that may be representative of the operations executed by one embodiment of the system 100 to optimize an attribute of a product according to a product context. For example, the various processes illustrated in the diagram 200 may be carried out with the server 104 and/or the client 106 under control of the server 104.

With reference now to FIGS. 1 and 2, the client 106 under control of the server 104 presents 202 a product context to a user via the GUI 116, which may be executed by the server 104 and/or the client 106 under control of the server 104. The product context is associated with any one of text, price, brand, visualization, packaging, and visualization of a previous version of the product.

The client 106 under control of the server 104 presents 204 a visual rendering of the product including at least one modifiable attribute of the product to the user via the GUI 116. In one embodiment, the server 104 and/or the client 106 under control of the server 104 may present textual content, brand, pricing, or retail setting associated with the product context to the user via the GUI 116. Interacting with the GUI 116 with an input device coupled to the client 106, the user may modify an attribute of the product. An input device may comprise a monitor (e.g., touch screen), microphone (e.g., voice recognition), video camera (e.g., image capturing and recognition), mouse, and keyboard, coupled to an I/O port of the client 106. In one embodiment, the client 106 under control of the server 104 presents a modifiable attribute of the product via the GUI 116 and receives a user input corresponding to a modified attribute of the product. The modifiable attributes comprise any one of a user selectable modifiable appearance (e.g., size, shape, color, texture, additive) and audible waveform (e.g., sound) associated with the modifiable attribute of the product. In another embodiment, the client 106 under control of the server 104 presents a modifiable quantity of the product via the GUI 116 and receives a user input corresponding to a modified quantity of the product. In one embodiment, the modifiable attribute of a food product is presented via the GUI 116 and the server 104 receives a user input corresponding to a modified attribute of the food product. In another embodiment, the modifiable attribute of a pet food product is presented via the GUI 116 and the server 104 receives a user input corresponding to a modified attribute of the pet food product.

The server 104 receives 206 the user input corresponding to a modified attribute of the product. Substantially simultaneously, the server 104 modifies and displays 208 via the GUI 116 the modified attribute of the product based on the user input. Substantially simultaneously is intended to describe input latency, which is the difference between the time the user input is received by the server 104 and the time the modified attribute is shown by the GUI 116. In one embodiment, the server 104 receives a textual input from the user. The textual input corresponds to the modified attribute of the product. In another embodiment, the server 104 receives a verbal input from the user. The verbal input corresponds to the modified attribute of the product.

The server 104 and/or a researcher determine 210 a correlation between the user input and an attribute of the product in reference to the product context when a termination command is received. In one embodiment, the correlation between the user input and an attribute of the product in reference to the product context is associated with a series of weighted questions. A corresponding association between the user input and a description of the product context may be determined by the server 104 and/or the researcher based on the correlation between the user input and the description of the attribute of the product in reference to the product context. The server 104 and/or the researcher determine whether the product context matches a user perception of the product. The user perception is determined based on the corresponding association between the user input and the description of the product context based on the correlation between the user input and the description of the attribute of the product in reference to the product context.

The user may interactively iterate through the process described in the diagram 200 until such time as the user is sufficiently satisfied. The server 104 interactively displays the modifiable and modified attributes of the product via the GUI 116, receives new user inputs corresponding to newly modified attributes of the product, and substantially simultaneously modifies and displays, via the GUI 116, the modified attribute of the product based on newly submitted user inputs. The server 104 and/or the researcher then determine a correlation between the new user input and an attribute of the product in reference to the product context when the termination command is received. As previously described, the correlation between the user input and the attribute of the product in reference to the product context may be associated with a series of weighted questions and answers. With weighted questions, different questions may be worth different amounts. For example, an answer to one question may be worth two (2) points and an answer to a different answer may be worth twice that or four (4) points. With weighted answers, different answers to the same question may be worth different amounts. For example, one answer to a question may be worth one (1) point, and another answer to the same question may be worth half that (0.5).

Figure 3:
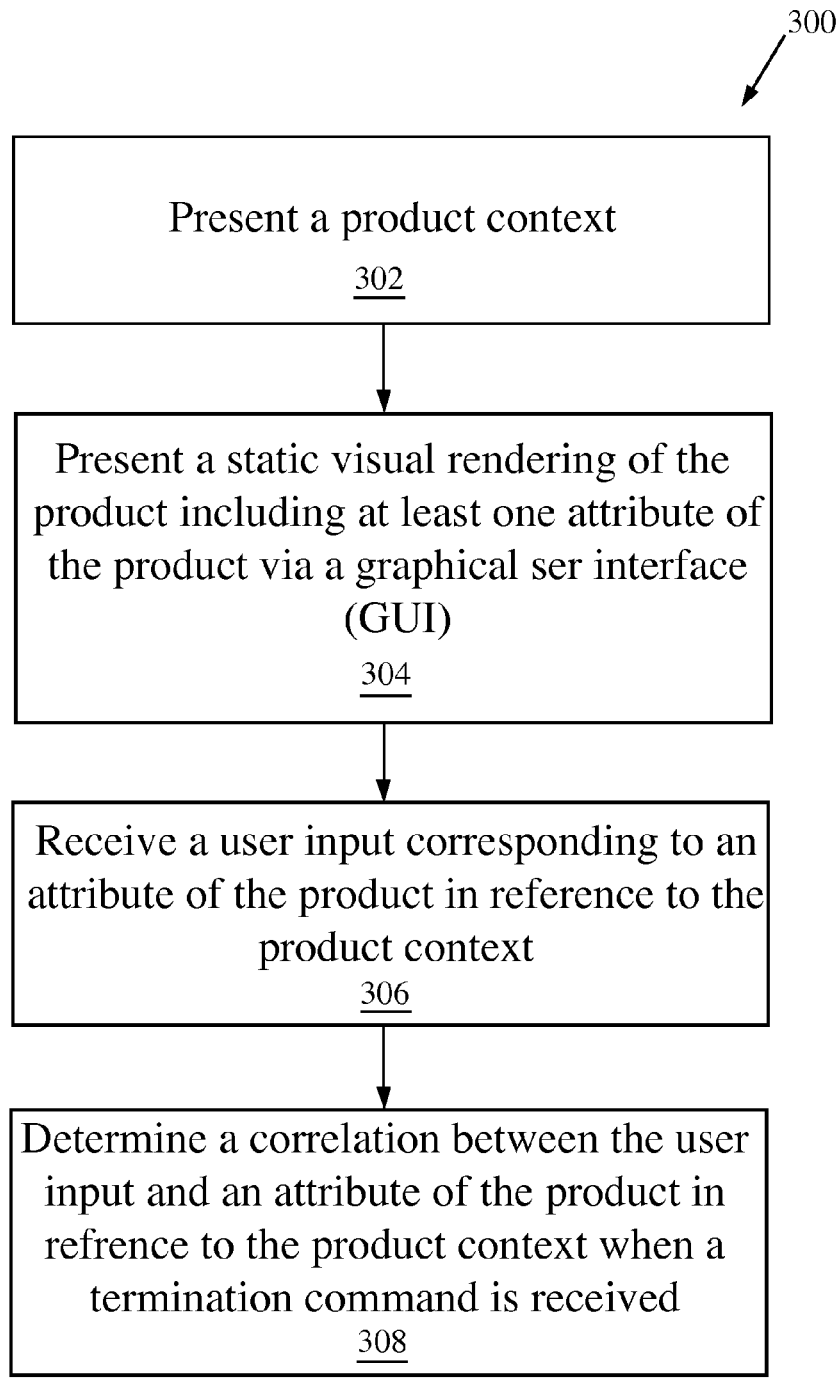
FIG. 3 illustrates a diagram that may be representative of the operations executed by one embodiment of the system shown in FIG. 1 to optimize an attribute of a product according to a product context.

FIG. 3 illustrates a diagram 300 that may be representative of the operations executed by the system 100 to optimize an attribute of a product according to a product context. For example, the various processes illustrated in the diagram 300 may be carried out with the server 104 and/or the client 106 under control of the server 104.

With reference now to FIGS. 1 and 3, the client 106 under control of the server 104 present 302 a product context to a user via the GUI 116, which may be executed by the server 104 and/or the client 106 under control of the server 104. The product context is associated with any one of text, price, brand, visualization, packaging, and visualization of a previous version of the product.

The client 106 under control of the server 104 presents 304 a static visual rendering of the product including at least one attribute of the product via the GUI 116. The user may select an attribute of the product. In one embodiment, the client 106 under control of the server 104 presents an attribute of the product via the GUI 116 and receives a user input corresponding to the attribute of the product. The attribute comprises any one of a user selectable appearance (e.g., size, shape, color, texture, additive) and sound associated with the attribute of the product. In another embodiment, the client 106 under control of the server 104 presents a quantity of the product via the GUI and receives a user input corresponding to a quantity of the product. A quantity may include a quantity of components or elements that make up the product. For example, if the product comprises multiple components, the quantity may refer to the amount or number of each individual component or the total amount or number of all components that make up the product. In one embodiment, the attribute of a food product is presented via the GUI 116 and the server 104 receives a user input corresponding to an attribute of the food product. In another embodiment, the attribute of a pet food product is presented via the GUI 116 and the server 104 receives a user input corresponding to an attribute of the pet food product. In one embodiment, two or more static renderings of the product may be presented via the GUI 116. Each one of the two or more static renderings of the product comprises at least one attribute. In another embodiment, the static renderings of the two or more products may be presented monadically, e.g., one at a time.

The server 104 receives 306 the user input corresponding to an attribute of the product in reference to the product context. As previously described with reference to the diagram 200 shown in FIG. 2, in various embodiments, the server 104 may receive a textual input or a verbal input from the user.

The server 104 and/or a researcher determine 308 a correlation between the user input and an attribute of the product in reference to the product context when a termination command is received. In one embodiment, the correlation between the user input and an attribute of the product in reference to the product context is associated with a series of weighted questions. A corresponding association between the user input and a description of the product context may be determined by the server 104 and/or the researcher based on the correlation between the user input and the description of an attribute of the product in reference to the product context. The server 104 and/or the researcher determine whether the product context matches a user perception of the product. The user perception is determined based on the corresponding association between the user input and the description of the product context based on the correlation between the user input and the description of an attribute of the product in reference to the product context.

The user may interactively iterate through the process described in the diagram 300 until such time as the user is sufficiently satisfied. The server 104 interactively with the user iterates to present a static rendering of the product including at least one attribute of the product via the GUI 116 and receives a new user input corresponding to a new attribute of the product in reference to the product context. The server 104 and/or the researcher then determine a correlation between the new user input and an attribute of the product in reference to the product context when the termination command is received.

The operation of the above described system 100 may be better understood by way of the following examples. In one example, the system 100 may be employed to obtain feedback from a focus group where a user may choose to be their own chef and the user can design attributes of a product such as pet food to suit their desires or needs. The users are not asked to answer any questions. User input data are analyzed to identify common visual themes selected by the user. The user may be a user chosen to participate in a focus group by completing a survey of pre-screening questions to determine whether the user owns a dog or cat, breed of pet, age of pet, and brand of pet food purchase today. If selected, the user becomes part of a focus group and is virtually presented the product context via the GUI 116 by the client 106 under control of the server 104. The product context in this example encompasses a product concept, pricing, and branding of the product. Presenting the product context educates the user on characteristics that might normally be associated with the product. The user is then taken to a GUI 116 screen that allows the user to design the attributes of a product. The user chooses the appearance (e.g., size, shape, color, texture, additive) and sound attributes of one or more types of kibbles in a pet food bowl. The user may continue to see multiple iterations of the rendered food image before settling on the final product appearance. The user completes their product appearance and the server 104 stores their product design and associates it to the pre-screening data gathered from the users. The user is then presented a "Thank You for Participating" GUI 116 screen and no further questions are presented. Upon receipt of the focus group's responses, the researcher(s) reviews all product designs and identifies common design themes. These design themes are then used to develop the appearance of a commercial product or to continue to refine the development of the appearance of a product prototype.

In another example, the system 100 may be employed to obtain feedback from a focus group where a user may choose to be their own chef and the user can design the attributes of a product such as pet food to suit their desires or needs. The users are asked to respond to one or more questions to rate a product. User input data and responses are aggregated and ranked according to various visualization options to identify common visual themes. The user may be a user chosen to participate in a focus group by completing a survey of pre-screening questions to determine whether the user owns a dog or cat, breed of pet, age of pet, and brand of pet food you purchase today. If selected, the user becomes part of a focus group and is virtually presented the product context via the GUI 116 by the client 106 under control of the server 104. The product context encompasses a product concept, pricing, and branding of the product. Presenting the product context educates the user on characteristics that might normally be associated with the product. The user is then taken to a GUI 116 screen that allows the user to design the attributes of a product. The user chooses the appearance (e.g., size, shape, color, texture, additive) and sound attributes of one or more types of kibbles in the food bowl. The user may continue to see multiple iterations of the rendered food image before settling on the final product appearance. The user completes their product appearance and the server 104 stores the product design and associates it to the pre-screening data gathered from the users. The user is then presented with one or more questions that identify their satisfaction with the product design they have selected and the previously presented product context. An example of a question the user may be asked is, "How would you rate the overall appearance of this dry pet food?" After the user answers the question, the user is then presented a "Thank You for Participating" GUI 116 screen and no further questions are presented. Upon receipt of the responses from the focus group, the researcher(s) reviews all product designs and identifies common design themes. All individual responses submitted by the users are aggregated to determine the ranking of the various visualization options. The design themes coupled with responses submitted by the users to questions after designing the food are then used to develop the appearance of a commercial product or to continue to refine the development of the appearance of a product prototype.

In yet another example, the system 100 may be employed to obtain feedback associated with the user liking a modifiable visualization of a product. The users are presented with limited visualization choices. One or more modifiable visualizations are shown to the user. The selected visualizations are analyzed but no questions are asked of the user. The user may be a user chosen to participate in a focus group by completing a survey of pre-screening questions to determine whether the user owns a dog or cat, breed of pet, age of pet, and brand of pet food you purchase today. If selected, the user becomes part of a focus group and is virtually presented the product context via the GUI 116 by the client 106 under control of the server 104. The product context encompasses a product concept, pricing, and branding of the product. Presenting the product context educates the user on the type of feedback of interest. The user is then taken to a GUI 116 screen that allows the user to design some, but not all, of the attributes of a product. The user is presented with the opportunity to change the appearance of one or more but not all of the kibble attributes such as size, shape, color, texture, and additive or any sounds associated with the kibble attributes. The user may continue to see multiple iterations of the rendered food image before settling on the final product appearance. The user completes their product appearance and the server 104 stores their product design and associates it to the pre-screening data gathered from the users. The user is then presented a "Thank You for Participating" GUI 116 screen and no further questions are presented. Upon receipt of the responses from the focus group, the researcher(s) reviews all product designs and identifies common design themes. These design themes are then used to develop an appearance of a commercial product appearance or to continue to refine the development of the appearance of a product prototype.

In still another example, the system 100 may be employed to obtain feedback associated with the user liking a modifiable visualization of a product. The users are presented with limited visualization choices. One or more modifiable visualizations are shown to the user. The selected modifiable visualizations are analyzed and rated. The user may be a user chosen to participate in a focus group by completing a survey of pre-screening questions to determine whether the user owns a dog or cat, breed of pet, age of pet, and brand of pet food you purchase today. If selected, the user becomes part of a focus group and is virtually presented the product context via the GUI 116 by the client 106 under control of the server 104. The product context encompasses a product concept, pricing, and branding of the product. Presenting the product context educates the user on the type of feedback of interest. The user is then taken to a GUI 116 screen that allows the user to design some, but not all, of the attributes of a product. The user is presented with the opportunity to change the appearance of one or more but not all of the kibble attributes such as size, shape, color, texture, and additive or any sounds associated with the kibble attributes. The user may continue to see multiple iterations of the rendered food image before settling on the final product appearance. The user completes their product appearance and the server 104 stores their product design and associates it to the pre-screening data gathered from the users. The user is then presented with one or more questions that identify their satisfaction with the product design they have selected and the previously presented product context. An example of a question the user may be asked is, "How would you rate the overall appearance of this dry pet food?" After the user answers the question, the user is then presented a "Thank You for Participating" GUI 116 screen and no further questions are presented. Upon receipt of the responses from the focus group, the researcher(s) reviews all product designs and identifies common design themes. All individual responses of the users are then aggregated to determine the ranking of the various visualization options. The design themes coupled with user responses to questions after designing the food are then used to develop the appearance of a commercial product or to continue to refine the development of the appearance of a product prototype.

In yet another example, the system 100 may be employed to obtain feedback associated with the user liking a non-modifiable visualization of a product. The users are presented with limited visualization choices. Two or more visualizations are shown to the user. The selected non-modifiable visualizations are analyzed. The user may be a user chosen to participate in a focus group by completing a survey of pre-screening questions to determine whether the user owns a dog or cat, breed of pet, age of pet, and brand of pet food you purchase today. If selected, the user becomes part of a focus group and is virtually presented the product context via the GUI 116 by the client 106 under control of the server 104. The product context encompasses a product concept, pricing, and branding of the product. Presenting the product context educates the user on the type of feedback of interest. The user is then taken to a GUI 116 screen that presents two renderings of pet food kibble in a bowl. The user is to review both bowls and select the bowl of kibble per the direction from the product context statement. The user may go back to the product context GUI 116 screen(s) to review this information again before making their product selection. The user makes their product selection and the server 104 stores their answer and associates it to the pre-screening data gathered from the users. The user is then presented a "Thank You for Participating" GUI 116 screen and no further questions are presented. All individual responses by the users are then aggregated to determine the ranking of the various visualization options.

In still another example, the system 100 may be employed to obtain feedback associated with the user liking a non-modifiable visualization of a product. The users are presented with limited visualization choices. Two or more visualizations are shown to the user. The selected non-modifiable visualizations are analyzed and rated. The user may be a user chosen to participate in a focus group by completing a survey of pre-screening questions to determine whether the user owns a dog or cat, breed of pet, age of pet, and brand of pet food you purchase today. If selected, the user becomes part of a focus group and is virtually presented the product context via the GUI 116 by the client 106 under control of the server 104. The product context encompasses a product concept, pricing, and branding of the product. Presenting the product context educates the user on the type of feedback of interest. The user is then taken to a GUI 116 screen that presents two renderings of pet food kibble in a bowl. The user is to review both bowls and select the bowl of kibble per the direction from the product context statement. The user may go back to the product context screen(s) to review this information again before making their product selection. The user makes their product selection and the virtual kibble tool stores their answer and associates it to the pre-screening data gathered from the users. The user is then presented with a series of survey questions. A first question may be, "Thinking about the product bowl you selected, how well does this product meet the needs of your pet?" The user may select an answer from multiple choices such as five choices ranging from "extremely well" to "not well at all," for example. A second question may be, "Assuming this product was available in the store where you regularly shop, how likely would you be to purchase this product?" The user may select an answer from multiple choices such as five choices ranging from "definitely would buy" to "definitely would not buy." After the user answers the last question, they would be presented with a "Thank You for Participating" GUI 116 screen. All individual responses by the users are aggregated to determine the ranking of the various visualization options.

In yet another example, the system 100 may be employed to obtain feedback associated with surveying Internet users regarding pet food visualization. The users are presented with a context allowing individual users to create their own visualization. The users are then asked to respond to one or more questions. The responses are analyzed. The process gathers feedback from a control group, which may be users that have been pre-selected or users that have completed and passed an on-line survey. Users in the control group would receive an email with a link and logon credentials to the virtual product design website. After a successful logon to this website, the user would be presented with the product context information via the GUI 116 by the client 106 under control of the server 104. The context information may comprise product concept and branding. After the user reviews the product context strategy, the user may be taken to a webpage where a bowl is empty. To populate the bowl with kibble, the user would be allowed to select the appearance of the kibble attributes such as size, shape, color, texture, and additive or the sound associated with the kibble attribute. The user may choose between two kibble colors, two kibble sizes, and two kibble shapes, for examples, or any integer number attributes. The user may mix colors, shapes, and sizes into the bowl while increasing or decreasing the amount of a selected kibble attribute. Once the user is satisfied with their bowl of kibble, they will press the "Save Changes" button. Their configured bowl data is stored by the server 104 with the demographic data associated with the user. The user is now presented with a survey question, "Assuming this product was available in the store where you regularly shop, how likely would you be to purchase this product?" The user may select an answer ranging from "definitely would buy" to "definitely would not buy." After the user answers this question, they would be presented with a "Thank You for Participating" GUI screen 116. All individual responses submitted by the users are aggregated to determine the ranking of the various visualization options.

Figure 4:
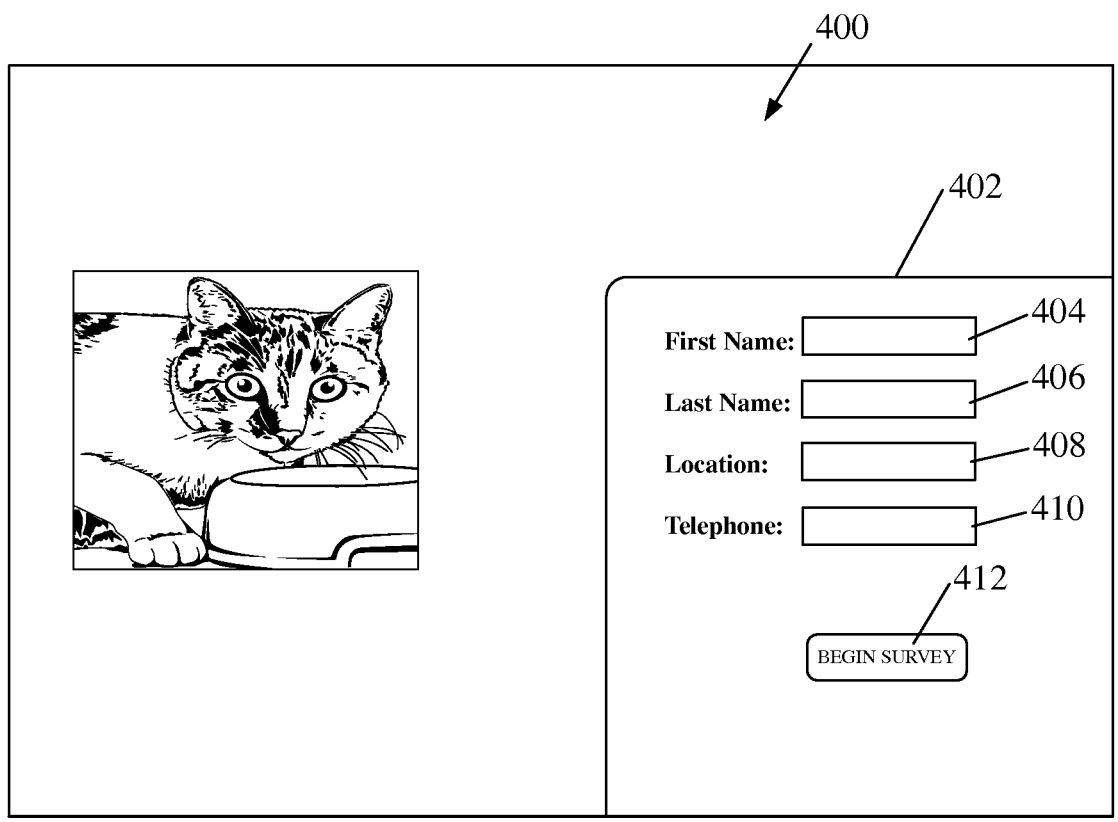

FIGS. 4-13 illustrate various representative screen shots that may be used to implement one embodiment of a graphical user interface (GUI). The operation of the above described system 100 may be better understood by way of the following representative screen shots that may be used to implement one embodiment of the GUI 116 that may be presented to the user by the client 106 under control of the server 104. FIG. 4 illustrates an initial screen shot 400 that is presented to the user by the client 106 via the GUI 116 when the user logs into a product survey website to optimize an attribute of a product according to a product context. The initial screen shot 400 displays a user profile input text box 402 that provides a framework for capturing pertinent information about the user. Within the user profile input text box 402 the user enters "First Name" 404, "Last Name" 406, "Location" 408, and "Telephone" 410. Additional or fewer text boxes may be displayed to capture more or less information about the user profile. The information captured regarding the user profile may be used as a means to categorize the individual user into a defined sub-population of users. After the user profile information is entered into the user profile text box 402, the user may select the "BEGIN SURVEY" button 412 to launch a concept demo screen shot. The embodiments are not limited in this context.

Figure 5:
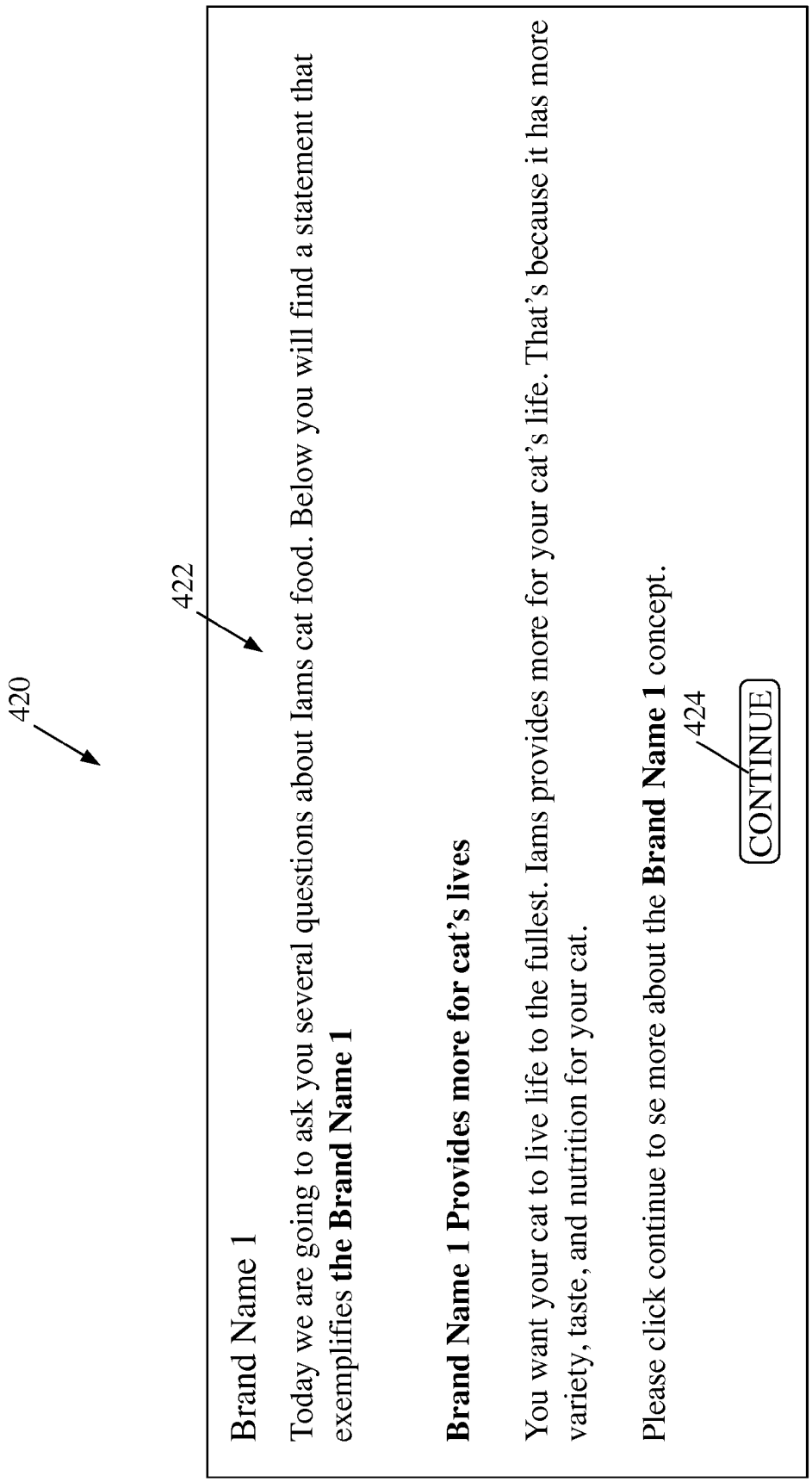

FIG. 5 illustrates a product context screen shot 420 that is displayed when the "BEGIN SURVEY" button 412 is selected in the initial screen shot 400. A product concept 422 is presented to the user. To continue to see more about the product concept, the user may select the CONTINUE button 424 to launch a screen shot that provides additional information about the product concept. The embodiments are not limited in this context.

FIG. 6 illustrates a more detailed product context screen shot 430. A first table 446 includes a "Brand" column 432, a "Size" column 434, and a "Price" column 436 for a first entity, which in one embodiment may be the entity that manufactures, distributes, sells, or markets the underlying product. A second table 448 includes a "Other Leading Brands" column 438, a "Size" column 440, and a "Price" column 442 for one or more entities that may compete with the first entity. Other product contexts may be associated with any one of text, visualization, packaging, and visualization of a previous version of the product. Selecting the CONTINUE button 444 launches another concept screen. The embodiments are not limited in this context.

Figure 7:
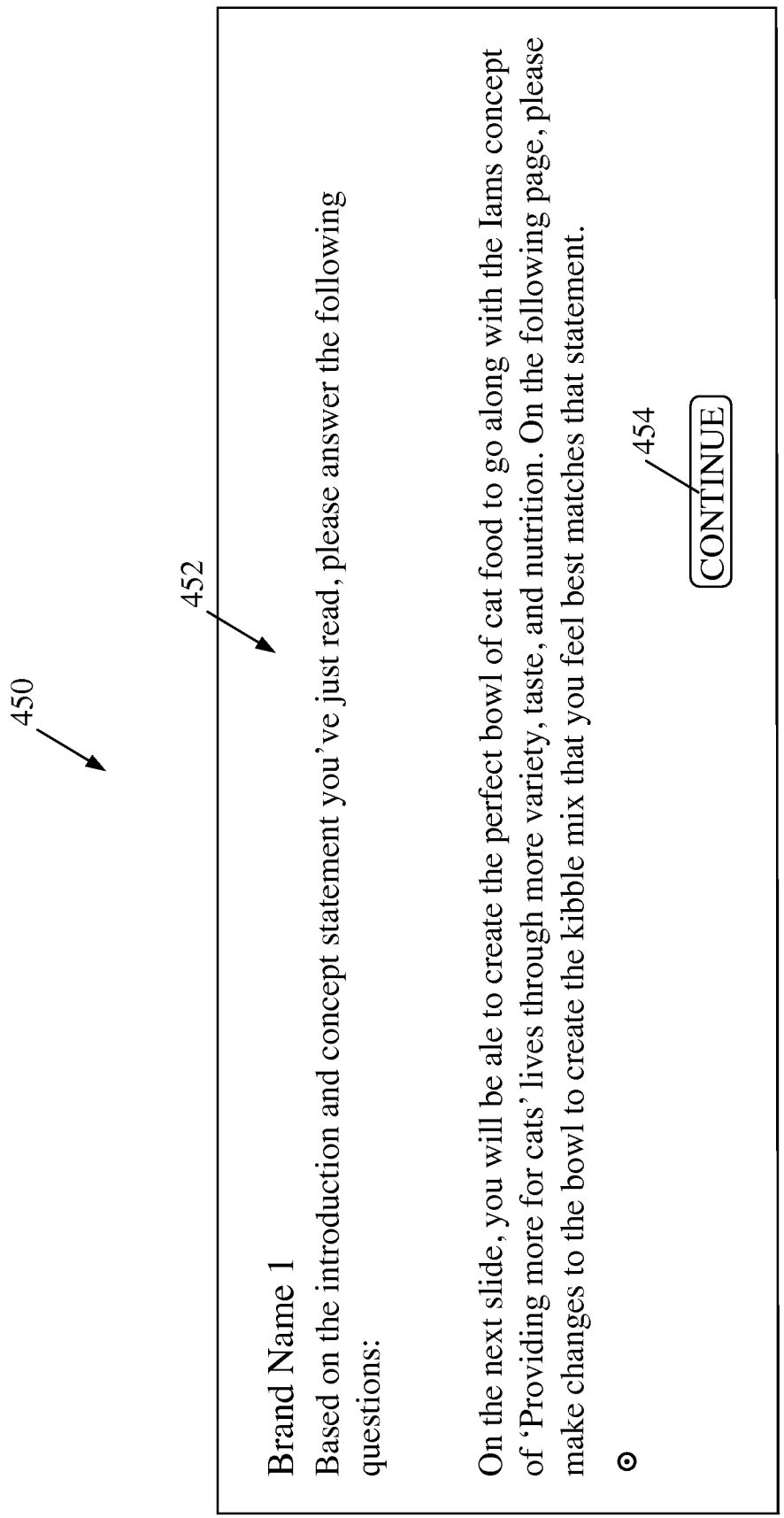

FIG. 7 illustrates a context screen shot 450 that displays a inquiry text box 452 that asks the user whether they wish to continue to optimize an attribute of the product according to a product context. As previously discussed a product context may be associated with any one of text, price, brand, visualization, packaging, and visualization of a previous version of the product. To proceed to the optimization screen shots, the user selects the CONTINUE button 454. The embodiments are not limited in this context.

Figure 8:
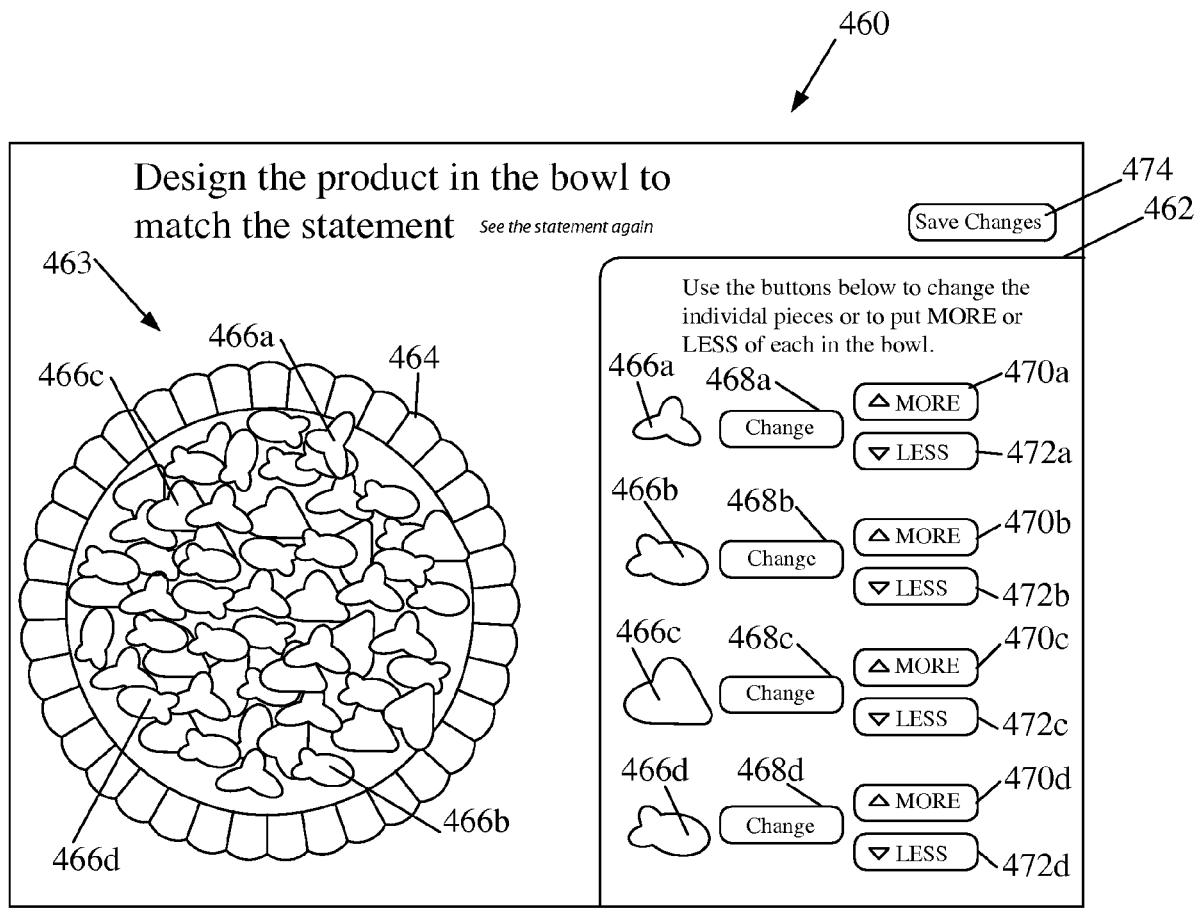

FIG. 8 illustrates a product optimization screen shot 460. The product optimization screen shot 460 presents an attribute modification portion 462 and a product visualization portion 463. The attribute modification portion 462 includes various product components 466a, 466b, 466c, 466d. Additional or fewer components may be displayed based on the type of product being optimized. Attributes associated with each of the components 466a-d may be modified or changed by selecting the corresponding "Change" button 468a-d associated with the components 466a-d. The quantity of each component 466a-d may be increased by selecting corresponding "More" buttons 470a-d or decreased by selecting corresponding "Less" buttons 472a-d. The product visualization portion 463 displays substantially simultaneously the resulting modifications made to the product attributes using the buttons 470a-d, 472a-d in the attribute modification portion 462. In the illustrated example, the visualization portion 463 displays a bowl 464 that contains the various selected components 466a-d of the product in the quantities selected using the "More or "Less" buttons 470a-d, 472a-d. Multiple attributes of each of the components 466a-d may be modified by selecting the "Change" button 468a-d associated with each of the components 466a-d. Ay changes made using the buttons 468a-d, 470a-d, or 472a-b may be saved by selecting the "Save Changes" button 474. The embodiments are not limited in this context.

Figure 9:
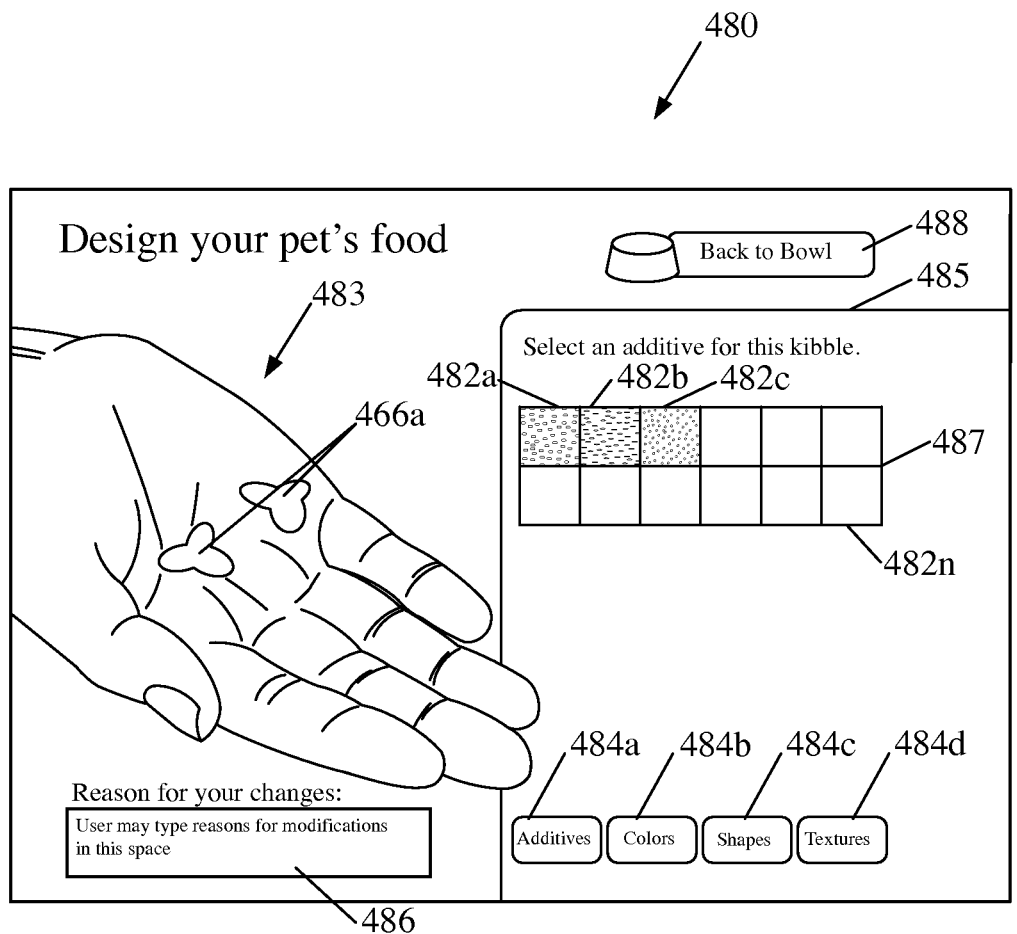

FIG. 9 illustrates an additives attribute modification screen shot 480. This screen shot 480 is displayed when the user selects the "Change" button 468a in the product optimization screen shot 460 shown in FIG. 8. In the illustrated example, one of four attribute modification screenshots may be displayed. The additives attribute modification screen shot 480 presents an additives attribute modification portion 485 and an additives visualization portion 483. The additives attribute modification portion 485 includes attribute modifications buttons 484a-d, where the user may select to modify the additives attribute by selecting the "Additive" attribute button 484a, the color attribute by the selecting the "Color" attribute button 484b, the shape attribute by selecting the "Shape" attribute button 484c, or the texture attribute by selecting the "Texture" attribute button 484d. Additional or fewer attribute buttons may be displayed based on the product being optimized. The additives attribute modification portion 485 includes a grid 487 that includes up to n cells, where n is any integer. Each cell 482a, 482b, 482c, or 482n includes a predetermined type of additive that may be added to the product in the bowl 464 (FIG. 8). The user selects a cell 482a-n to select the predetermined additive. The modified component 466a is shown in the additives visualization portion 483 substantially simultaneously to provide a visualization of what the component 466a looks like. The user may continue to select a cell 482a-n until the user is satisfied and selects the "Back to Bowl" button 488, which displays an updated product optimization screen shot 460 shown in FIG. 8. A user text input box 486 is provided for the user to enter any reasons for their changes. The embodiments are not limited in this context.

As shown in FIG. 9, the user may enter a comment in the user text input box 486. These text messages may be categorized and weighted and analyzed along with the other attributes of the product. These comments are generally directed to reasons why the user chose to make the various modifications within the screen shot. In the illustrated example, the user entered a comment in the user text input box 486 associated with the reasons for making the changes within the additives attribute modification screen shot 480. The embodiments are not limited in this context.

Figure 10:
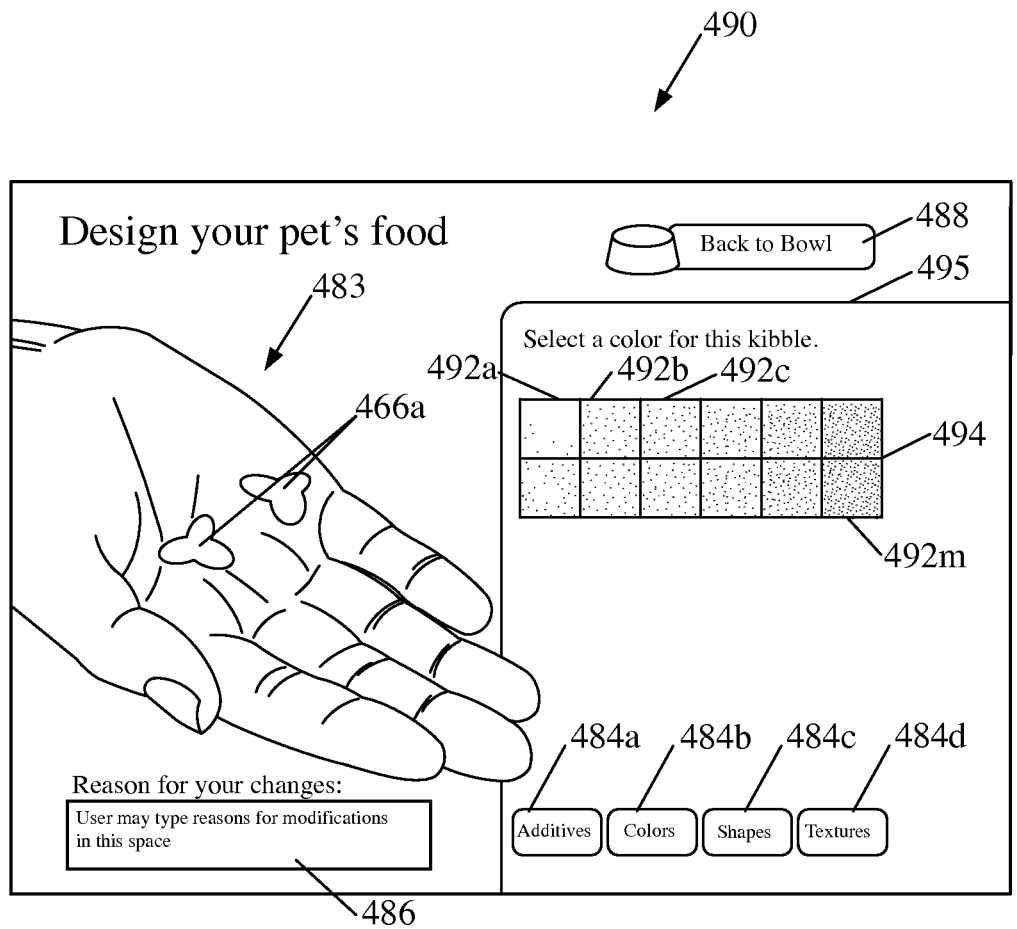

FIG. 10 illustrates a color attribute modification screen shot 490. This screen shot 490 is displayed when the user selects the "Color" attribute button 484b in any of the attribute modification screen shots. The color attribute modification screen shot 490 presents a color attribute modification portion 495 and a color attribute visualization portion 493. The color attribute modification portion 495 includes a grid 494 that includes up to m different cells, where m is any integer (e.g., in one embodiment n=m). Each cell 492a, 492b, 492c, or 492m includes a predetermined color attribute for the product components 466a-d in the bowl 464 (FIG. 8). The user selects a color cell 492a-m to select the predetermined color. The modified component 466a is shown in the color visualization portion 493 substantially simultaneously to provide a visualization of what the component 466a looks like in the newly selected color. The user may continue to select a cell 492a-m until the user is satisfied and selects the "Back to Bowl" button 488, which displays an updated product optimization screen shot 460 shown in FIG. 8. A user text input box 486 is provided for the user to enter any reasons for their changes. The embodiments are not limited in this context.

Figure 11:
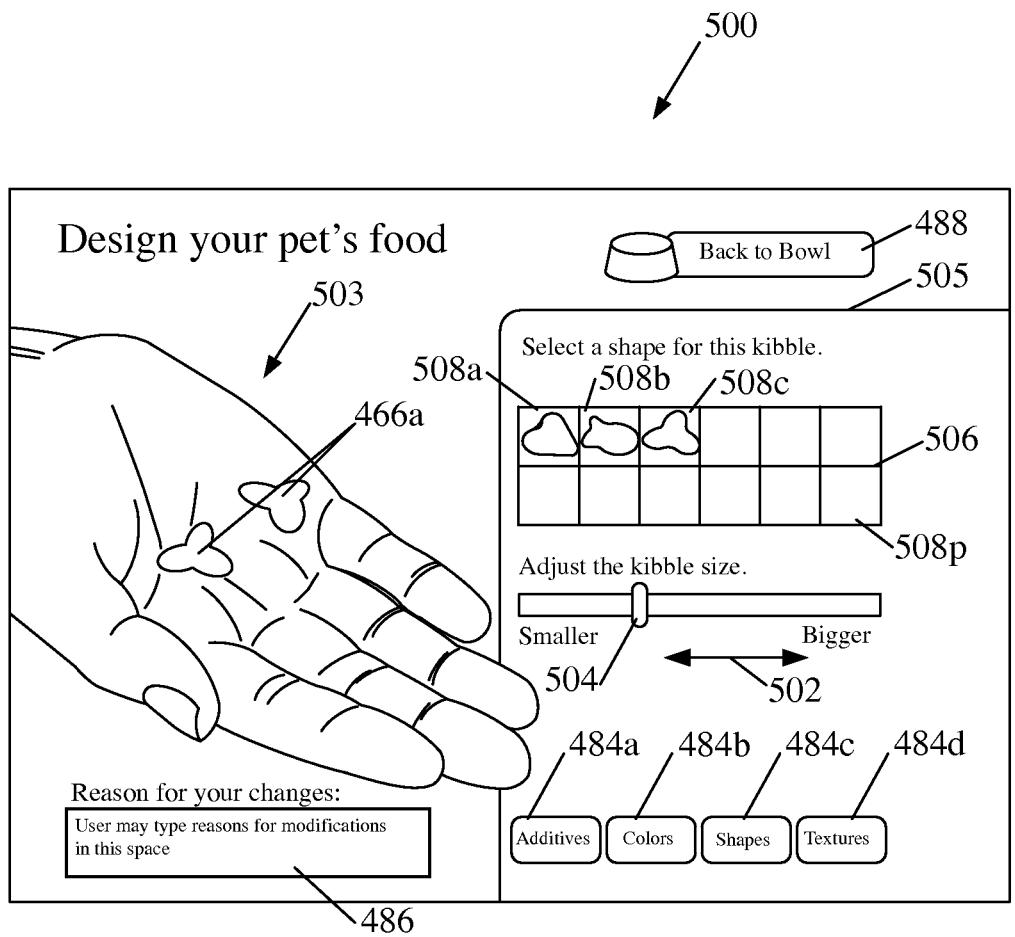

FIG. 11 illustrates a shape attribute modification screen shot 500. This screen shot 500 is displayed when the user selects the "Shape" attribute button 484c in any of the attribute modification screen shots. The shape attribute modification screen shot 500 presents a shape attribute modification portion 505 and a shape attribute visualization portion 503. The shape attribute modification portion 505 includes a grid 506 that includes up to p different cells, where p is any integer (e.g., in one embodiment n=m=p). Each cell 508a, 508b, 508c, or 508p includes a predetermined shape attribute for the product components 466a-d in the bowl 464 (FIG. 8). The user selects a shape cell 508a-p to select the predetermined shape. A slide bar 502 also is provided to increase or decrease the shape size by moving the slide bar 502 in direction 504. In the illustrated example, moving the slide bar 502 to the right makes the shapes larger and moving the slide bar 502 to the left makes the shapes smaller. The embodiments are not limited in this context. The modified component 466a is shown in the shape visualization portion 503 substantially simultaneously to provide a visualization of what the component 466a looks like in the newly selected shape. The user may continue to select a cell 508a-p until the user is satisfied and selects the "Back to Bowl" button 488, which displays an updated product optimization screen shot 460 shown in FIG. 8. A user text input box 486 is provided for the user to enter any reasons for their changes. The embodiments are not limited in this context.

Figure 12:
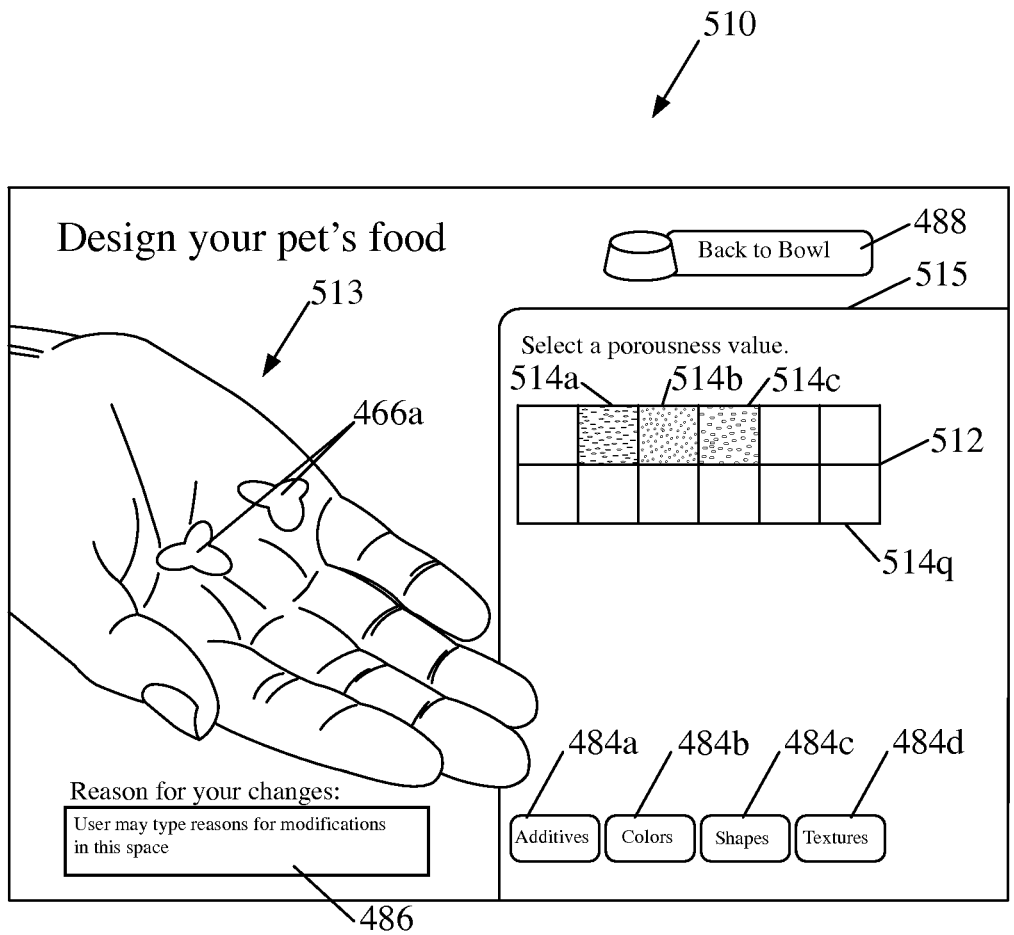

FIG. 12 illustrates a texture attribute modification screen shot 510. This screen shot 510 is displayed when the user selects the "Texture" attribute button 484d in any of the attribute modification screen shots. The texture attribute modification screen shot 510 presents a texture attribute modification portion 515 and a texture attribute visualization portion 513. The texture attribute modification portion 515 includes a grid 512 that includes up to q different cells, where q is any integer (e.g., in one embodiment n=m=p=q). Each cell 514a, 514b, 514c, or 514q includes a predetermined shape attribute for the product components 466a-d in the bowl 464 (FIG. 8). The user selects a texture cell 514a-q to select the predetermined texture. The modified component 466a is shown in the shape visualization portion 513 substantially simultaneously to provide a visualization of what the component 466a looks like in the newly selected shape. The user may continue to select a cell 514a-q until the user is satisfied and selects the "Back to Bowl" button 488, which displays an updated product optimization screen shot 460 shown in FIG. 8. A user text input box 486 is provided for the user to enter any reasons for their changes. The embodiments are not limited in this context.

Although the various examples of pet food products that may be evaluated using the GUI system 100 described herein relate to dried pet food products produced from extrusion, the embodiments are not limited in this context. For example, other types of kibbled pet food and wet pet foods may be evaluated using the GUI system 100. In addition, more specific examples of pet foods that may be evaluated using the GUI system 100 described herein include simulated meat products, chunk type products, pâté, soft-moist or loaf type products, biscuits, chews, gravies, powders, pills, and capsules. It will be appreciated that the scope of the products that may be evaluated using the GUI system 100 described herein are not limited to pet foods and the above described GUI system 100 may be employed to evaluate and obtain feedback for a variety of products including personal health care products, oral care products, beauty care products, paper products, and food products, among others.

Examples of personal health care products that may be evaluated using the GUI system 100 described herein relate to health and wellness products. Non-limiting examples of health and wellness products include compositions and devices for preventing and treating: (1) respiratory conditions, including cough, colds, and allergies; (2) gastrointestinal conditions, including heartburn, stomach upset, diarrhea, constipation, temper mental and/or irritable bowel; (3) obesity and other weight disorders or conditions; (4) pain; (5) sleep disorders; (6) low energy states; (7) joint flexibility or mobility; and (8) muscular/joint aches and pains. Additional non-limiting examples of health and wellness products include compositions and devices to maintain or improve health and well-being, including nutritional supplements and/or immune-modulators, water filtration and deliver system devices, and health diagnostic devices or services.

Examples of oral care products that may be evaluated using the GUI system 100 described herein relate to oral care products and compositions. Non-limiting examples include toothpastes, toothbrushes, mouth rinses, floss, whitening articles, and dentures.

Examples of beauty care products that may be evaluated using the GUI system 100 include personal care products including, but not limited to, those intended for use with hair or skin such as hair colorants, hair conditioners, shampoos, hair styling, hair permanents, hair treatments, personal cleansing, skin care (e.g., moisturization, anti-aging, ultraviolet [UV] protection), deodorants or antiperspirants, shaving aids, hair removal products, disposable or system wet shaving products, dry shaving razors, color cosmetics (e.g., lipstick, lip balm, foundations, mascaras, eye shadow), perfumes or fragrances. Forms of beauty care products include wipes, cloths, bars, liquids, powders, cremes, lotions, sprays, aerosols, foams, mousses, serums, capsules, gels, granules, emulsions, doe foots, roll-on applicators, sticks, sponges or other methods of delivering a material to the skin or hair. Beauty care products also include devices, appliances, applicators, implements, combs, brushes or substrates to be used alone on the skin or hair or in combinations with the above personal care products.

Examples of paper products that may be evaluated using the GUI system 100 described herein relate to disposable absorbent articles, sanitary tissue products, and cellulose-based disposable eating utensils. Non-limiting examples of disposable absorbent articles include disposable diapers, feminine hygiene products, and adult incontinence products. Non-limiting examples of sanitary tissue products include facial tissue, toilet tissue, paper towels, and paper napkins. Non-limiting examples of cellulose-based disposable eating utensils include paper cups and paper plates.

Examples of food products that may be evaluated using the GUI system 100 described herein relate to foods or beverages for humans. Non-limiting examples include breads, grains, muffins, cookies, cakes, crisps, chip-type snacks, potato chips, chips, tacos, corn chips, nachos, tortilla chips, other snack foods, doughnuts, other baked snacks, other fried snacks, candies, fabricated snack products, French fried potato strips, French fries, soups, sauces, puddings, baby foods, pastas, wafers, crackers, pretzels, pizza, ready-to-eat breakfast cereals, hot cereals, hot cereals, yogurts, ice cream, granola, granola bars, juices, coffees, hot beverages, cold beverages, flavored coffee beverages, instant coffee beverages, hot teas and cold teas.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, PLD, or DSP, and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While certain features of the embodiments have been illustrated as described herein, many modifications, substitutions, changes, and equivalents will now occur to those skilled in the art. It is therefore to be understood that the appended claims are intended to cover all such modifications and changes as fall within the true spirit of the embodiments.

What is claimed is:

1. A method of optimizing an attribute of a product according to a product context, the method comprising:
   presenting a product context to a user via a software graphical user interface (GUI);
   presenting a visual rendering of a pet food product comprising at least one modifiable attribute of the pet food product via the GUI wherein the modifiable attribute is selected from the group consisting of color, shape, texture, quantity, additive, and combinations thereof and wherein the modifiable attribute is changed by a predetermined increment;
   receiving a user input corresponding to a modified attribute of the pet food product;
   substantially simultaneously modifying via an attribute modification portion of the GUI and displaying the modified attribute of the pet food product via a product visualization portion of the GUI; and determining a correlation between the user input and the modified attribute of the pet food product in reference to the product context when a termination command is received.

2. The method of claim 1, comprising presenting any one of a textual content, brand, pricing, and retail setting associated with the product context.

3. The method of claim 1, comprising interactively iterating:
   presenting a new modifiable attribute of the pet food product via the GUI;
   receiving a new user input corresponding to the new modified attribute of the pet food product;
   substantially simultaneously modifying and displaying via the GUI the modified attribute of the pet food product based on the new user input; and
   determining a correlation between the new user input and the new modified attribute of the pet food product in reference to the product context when the termination command is received.

4. The method of claim 1, further comprising presenting static renderings of two or more pet food products via the GUI.

5. The method of claim 4, comprising presenting static renderings of the two or more pet food products monadically.

6. The method of claim 1, comprising receiving any one of a textual input and verbal input from the user, wherein either one of the textual input and verbal input corresponds to the modified attribute of the pet food product.

7. The method of claim 1, comprising determining a corresponding association between the user input and a description of the product context based on the correlation between the user input and the description of the attribute of the pet food product in reference to the product context.

8. The method of claim 7, comprising determining whether the product context matches a user perception of the pet food product, wherein the user perception is determined based on the corresponding association between the user input and the description of the product context based on the correlation between the user input and the description of the attribute of the pet food product in reference to the product context.

9. The method of claim 1, further comprising presenting any one of textual content, brand, pricing, and retail setting associated with the product context.

10. The method of claim 9, comprising determining a corresponding association between the user input and the attribute of the pet food product in reference to the product context based on the correlation between the user input and the attribute of the pet food product in reference to the product context.

11. The method of claim 1, wherein the product context is associated with any one of text, price, brand, visualization, packaging, and visualization of a previous version of the pet food product.

12. The method of claim 1, wherein the correlation between the user input and the attribute of the pet food product in reference to the product context is associated with a series of weighted questions.

13. The method of claim 10, comprising determining whether the product context matches a user perception of the pet food product, wherein the user perception is determined based on the corresponding association between the user input and a description of the pet food product context based on the correlation between the user input and the description of the attribute of the pet food product in reference to the product context.

14. The method of claim 9, wherein the product context is associated with any one of text, price, brand, visualization, packaging, and visualization of a previous version of the product.

15. The method of claim 9, wherein the correlation between the user input and the attribute of the pet food product in reference to the product context is associated with a series of weighted questions.

\* \* \* \* \*